United States Patent
Hoult et al.

(10) Patent No.: US 9,322,703 B2
(45) Date of Patent: Apr. 26, 2016

(54) SPECTROSCOPIC INSTRUMENT

(75) Inventors: Robert Alan Hoult, Beaconsfield (GB); Ralph Lance Carter, Towersey Nr Thame (GB)

(73) Assignee: PerkinElmer Singapore PTE Ltd., Singapore (SG)

( * ) Notice: Subject to any disclaimer, the term of this patent is extended or adjusted under 35 U.S.C. 154(b) by 549 days.

(21) Appl. No.: 13/817,363

(22) PCT Filed: Aug. 16, 2011

(86) PCT No.: PCT/GB2011/001224
§ 371 (c)(1),
(2), (4) Date: Apr. 26, 2013

(87) PCT Pub. No.: WO2012/022936
PCT Pub. Date: Feb. 23, 2012

(65) Prior Publication Data
US 2013/0220014 A1 Aug. 29, 2013

(30) Foreign Application Priority Data

Aug. 19, 2010 (GB) .................................. 1013917.8

(51) Int. Cl.
*G01J 3/02* (2006.01)
*G01J 1/02* (2006.01)
*G02B 27/00* (2006.01)

(52) U.S. Cl.
CPC ................. *G01J 1/0271* (2013.01); *G01J 1/02* (2013.01); *G01J 1/0252* (2013.01); *G01J 3/02* (2013.01); *G02B 27/0006* (2013.01); *G01J 3/0286* (2013.01)

(58) Field of Classification Search
None
See application file for complete search history.

(56) References Cited

U.S. PATENT DOCUMENTS

| 3,990,429 | A | | 11/1976 | Mazzoni et al. |
| 3,999,536 | A | | 12/1976 | Bauer et al. |
| 4,342,564 | A | * | 8/1982 | Lehmacher ................... 493/195 |
| 4,542,611 | A | | 9/1985 | Day |
| 4,560,250 | A | | 12/1985 | Russell |
| 4,755,031 | A | | 7/1988 | Daviau et al. |

(Continued)

FOREIGN PATENT DOCUMENTS

| CA | 1086145 A1 | 9/1980 |
| DE | 10117170 A1 | 10/2002 |

(Continued)

OTHER PUBLICATIONS

Written Opinion of the International Searching Authority from corresponding PCT/GB2011/001224 dated Feb. 19, 2013.
International Preliminary Report of Patentability from corresponding PCT/GB2011/001224 dated Feb. 19, 2013.

*Primary Examiner* — Robert R Raevis
(74) *Attorney, Agent, or Firm* — Lando & Anastasi, LLP

(57) ABSTRACT

A spectroscopic instrument comprising a compartment (2) for housing instrument components (3) and desiccant (4) to protect the instrument components, and a deformable container (5) having at least one wall portion which is movable within the compartment (2) so as to vary the volume of the compartment (2) that is occupied by the deformable container as the container is deformed. The interior of the deformable container (5) is in fluid communication with the surroundings of the instrument, such that a difference in pressure between the compartment and the surroundings tends to cause the deformable container to deform, moving the wall portion.

20 Claims, 7 Drawing Sheets

(56) References Cited

U.S. PATENT DOCUMENTS

| | | |
|---|---|---|
| 5,868,667 A | 2/1999 | Lin et al. |
| 6,800,114 B2 | 10/2004 | Vanderhoof et al. |
| 6,875,486 B2 * | 4/2005 | Miller .................... 428/34.1 |
| 7,082,003 B2 | 7/2006 | Correns et al. |
| 2004/0027565 A1 | 2/2004 | Correns et al. |
| 2004/0056198 A1 | 3/2004 | Tanaka |
| 2007/0125950 A1 | 6/2007 | Wang et al. |
| 2007/0183167 A1 * | 8/2007 | Koike et al. ................ 362/514 |
| 2008/0079846 A1 | 4/2008 | Ikari |
| 2008/0314899 A1 * | 12/2008 | Berkey et al. ........... 220/203.01 |
| 2011/0266244 A1 * | 11/2011 | Lustenberger et al. ........... 215/6 |

FOREIGN PATENT DOCUMENTS

| | | |
|---|---|---|
| DE | 102004037638 A1 | 3/2006 |
| EP | 1265325 A1 | 12/2002 |
| EP | 1388362 A2 | 2/2004 |
| GB | 644217 A | 10/1950 |
| JP | 2002-110275 A | 4/2002 |
| JP | 3113903 U | 9/2005 |
| JP | 2010-253454 A | 11/2010 |
| JP | 2011-183367 A | 9/2011 |
| WO | 9852254 A2 | 11/1998 |
| WO | 0241094 A1 | 5/2002 |

* cited by examiner

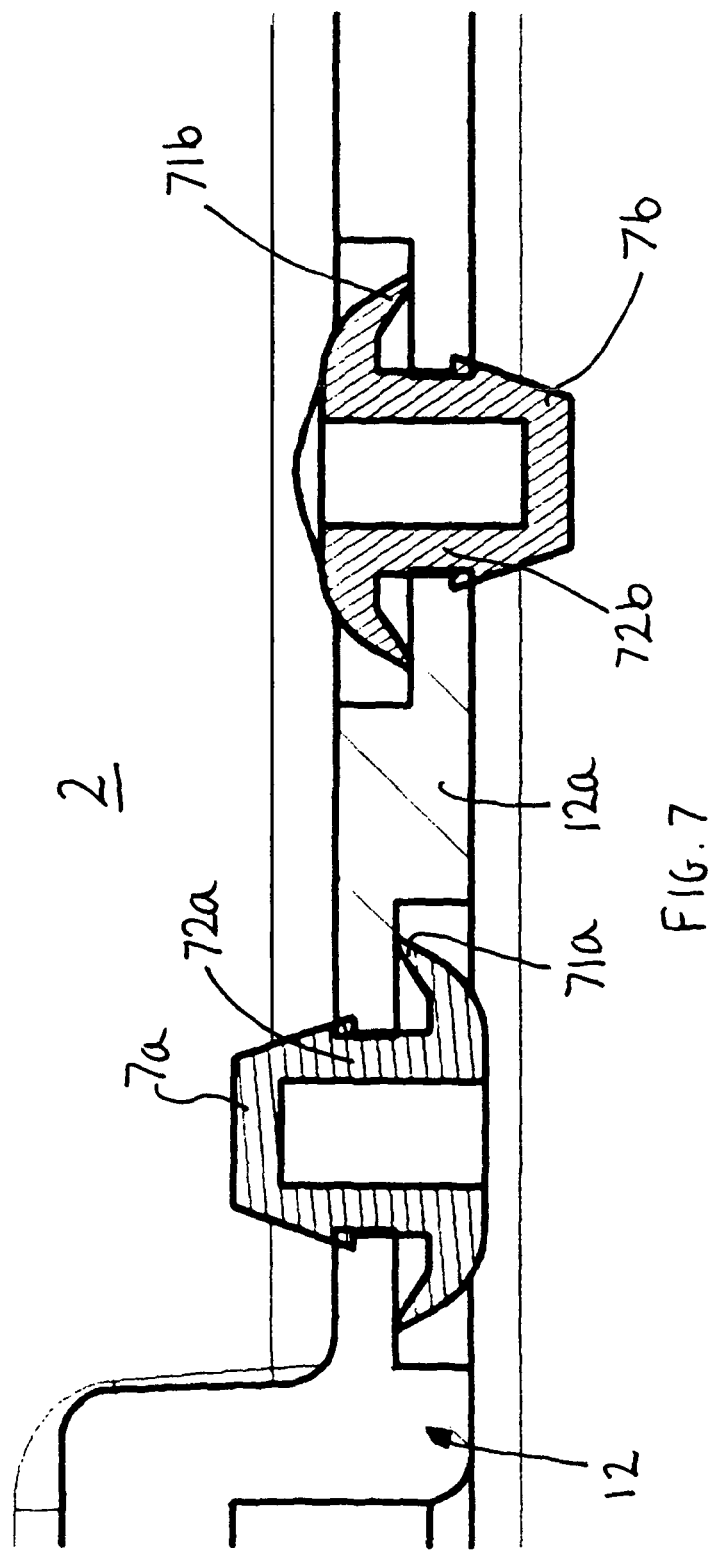

SPECTROSCOPIC INSTRUMENT

CROSS-REFERENCE TO RELATED APPLICATIONS

This application is a U.S. national phase application under 35 U.S.C. §371 of International (PCT) Patent Application Serial No. PCT/GB2011/001224 filed Aug. 16, 2011, which in turn claims the benefit of priority to Great Britain Patent Application Serial No. 1013917.8 filed Aug. 19, 2010.

This invention relates to spectroscopic instruments, for example Fourier transform infrared (FTIR) spectrometers. In particular it relates to spectroscopic instruments having performance which is sensitive to humidity levels and/or the presence of other possible contaminants.

Spectroscopic instruments can include components that are sensitive to moisture or other contaminants. These components might operate effectively only at humidity levels below some threshold humidity level, or tend to be damaged by moisture or other contaminants. For such instruments it is often impractical (for example too expensive) to provide a high vacuum enclosure, a dry gas purge system and/or a hermetically sealed enclosure for the components. Thus, some ingress of water and/or other contaminants is generally accepted. In such instruments, it is common to provide a compartment within which the components are placed together with desiccant to protect the components. Seals generally exist between the interior of the compartment and the surroundings, which reduce but do not prevent the flow of air, and hence water and other possible contaminants, into and out of the compartment.

Temperature differences between the instrument and the surroundings (for example due to use of the equipment), and atmospheric conditions, will tend to cause the pressure inside such a compartment to differ from that of the surroundings. These pressure differences tend to drive air exchange between the compartment and the surroundings due to a pressure difference pumping effect.

One particular pumping effect can occur when the instrument is switched on and off periodically—say daily. Air may be expelled from the compartment during use of the instrument due to it heating up, and be sucked back into the compartment when the equipment is switched off and cools. Note that if attempts are made to improve seals to counter these pumping effects massive pressure differences between the instrument and the surroundings can build up. Designing an instrument to withstand such pressure differences would lead to a more bulky and expensive instrument.

When air containing moisture and other possible contaminants enters the compartment, some of the water content will be absorbed by the desiccant. The desiccant can also absorb some other possible contaminants, for example carbon dioxide. However, for instruments in high humidity atmospheres, or instruments which experience frequent inflows of air into the compartment, the desiccant can quickly become exhausted and need to be replaced to maintain the performance of the instrument. In some cases, the desiccant may need to be replaced as often as every three months. This adds to the maintenance operations required to keep the instrument working properly, and increases the amount, and therefore the cost, of the desiccant needed and/or increases the risk that the instrument will be used when not functioning to its maximum potential.

It would be desirable to provide an instrument which does not suffer from these drawbacks.

According to the present invention, there is provided a spectroscopic instrument comprising a compartment for housing instrument components and desiccant to protect the instrument components, and a deformable container having at least one wall portion which is movable within the compartment so as to vary the volume of the compartment that is occupied by the deformable container as the container is deformed, the interior of the deformable container being in fluid communication with the surroundings of the instrument, such that a difference in pressure between the compartment and the surroundings tends to cause the deformable container to deform, moving the wall portion.

With this arrangement, as the deformable container deforms, the volume of the compartment that is occupied by the deformable container can change so as to tend to equalise pressure between the compartment and the surroundings. This in turn can reduce any pumping effect, which might otherwise cause the exchange of air between the compartment and the surroundings. This can extend desiccant lifetime.

Preferably, when at its maximum extent, the deformable container occupies between 5% and 50% of the volume of the compartment. Preferably, when at its maximum extent, the deformable container occupies between 10% and 15% of the volume of the compartment.

At least part of the deformable container may be of flexible material. The movable wall of the deformable container may be of flexible material. At least part of the deformable container may be of heat sealable material.

The deformable container may be of material with a low water diffusion rate, i.e. less than 30 mg water per square meter per day. Preferably, the deformable container is of material which is moisture resistant. Here moisture resistant is used in the sense of resisting the transmission of moisture through the material.

The deformable container may be of a laminate material. The laminate material may comprise at least one plastic layer and may comprise at least one metallic film layer. Preferably, the laminate material is a metallic film coated plastics material.

The deformable container may be a bag. The bag may comprise two or more walls which are heat sealed together.

The spectroscopic instrument may comprise at least one valve for allowing fluid communication between the compartment and the surroundings, when a pressure difference between the compartment and the surroundings exceeds a predetermined threshold. The valve may allow such fluid communication when the pressure in the compartment exceeds that of the surroundings by a greater than a threshold amount and/or the valve may allow such fluid communication when the pressure in the surroundings exceeds that of in the compartment by a greater than a threshold amount. Two valves may be provided, one being an over-pressure valve for relieving over pressure in the compartment and one being an under-pressure valve for relieving under pressure in the compartment.

The compartment may be defined by at least two housing parts with at least one seal therebetween.

Preferably, the at least one seal has a low water diffusivity, i.e. of approximately 100 g water per year or less. Preferably the at least one seal has a water diffusivity of less than 15 g water per year. The at least one seal may be of elastomer. For example, the at least one seal may be of a fluoroelastomer, such as Viton, Fluorel or Aflas. The at least one seal may be of perfluoroelastomer. Where there are a plurality of seals, these may be of different materials.

The spectroscopic instrument may comprise a tube-like portion which is arranged to allow fluid communication between the interior of the deformable container and the surroundings. The tube-like portion may have a first portion which extends into the interior of the deformable container and may have a second portion which extends to or into the exterior of the compartment.

A wall of the deformable container may comprise an aperture through which the tube-like portion extends.

The tube-like portion may be mounted on the deformable container.

Sealing means may be provided between the tube-like portion and the material of the deformable container to seal against ingress or egress of fluid through the aperture other than through the tube-like portion.

The tube-like portion may comprise a first threaded portion which protrudes into the interior of the deformable container and receives a corresponding nut for mounting the tube-like portion to the deformable container. A first seal which may comprise an O ring may be provided between the tube-like portion and the material of the deformable container.

A wall of the compartment may comprise an aperture through which the tube-like portion extends. The tube-like portion may be mounted to the compartment.

The tube-like portion may protrude exterior to the compartment. The tube-like portion may comprise a (second) threaded portion which protrudes to or into the exterior to the compartment through the aperture in the wall of the compartment, and receives a corresponding nut for mounting the tube-like portion to the compartment. Sealing means may be provided between the tube-like portion and the compartment wall to seal against ingress or egress of fluid through the aperture in the compartment wall other than through the tube-like portion. A (second) seal which may comprise an O ring may be provided between the tube-like portion and the wall of the compartment.

The word second is used in brackets above since the respective features may be used together with or independently of the respective "first" features defined further above.

The O ring of at least one of the first and second seal may be of elastomer. The or each O ring may be one of a fluoroelastomer, such as Viton, Fluorel or Aflas, and a perfluoroelastomer.

According to another aspect of the present invention there is provided a deformable container assembly for a spectroscopic instrument as defined above, comprising a deformable container in the form of a bag, and carried by the bag, a tube-like portion providing fluid communication with the interior of the bag.

The bag and tube-like portion may have any one of or any combination of the further features defined above.

Embodiments of the present invention will now be described, by way of example only, with reference to the accompanying drawings, in which:

FIG. 7 shows over pressure and under pressure valves provided in the spectrometer shown in FIGS. 1 and 2.

Figure 1:
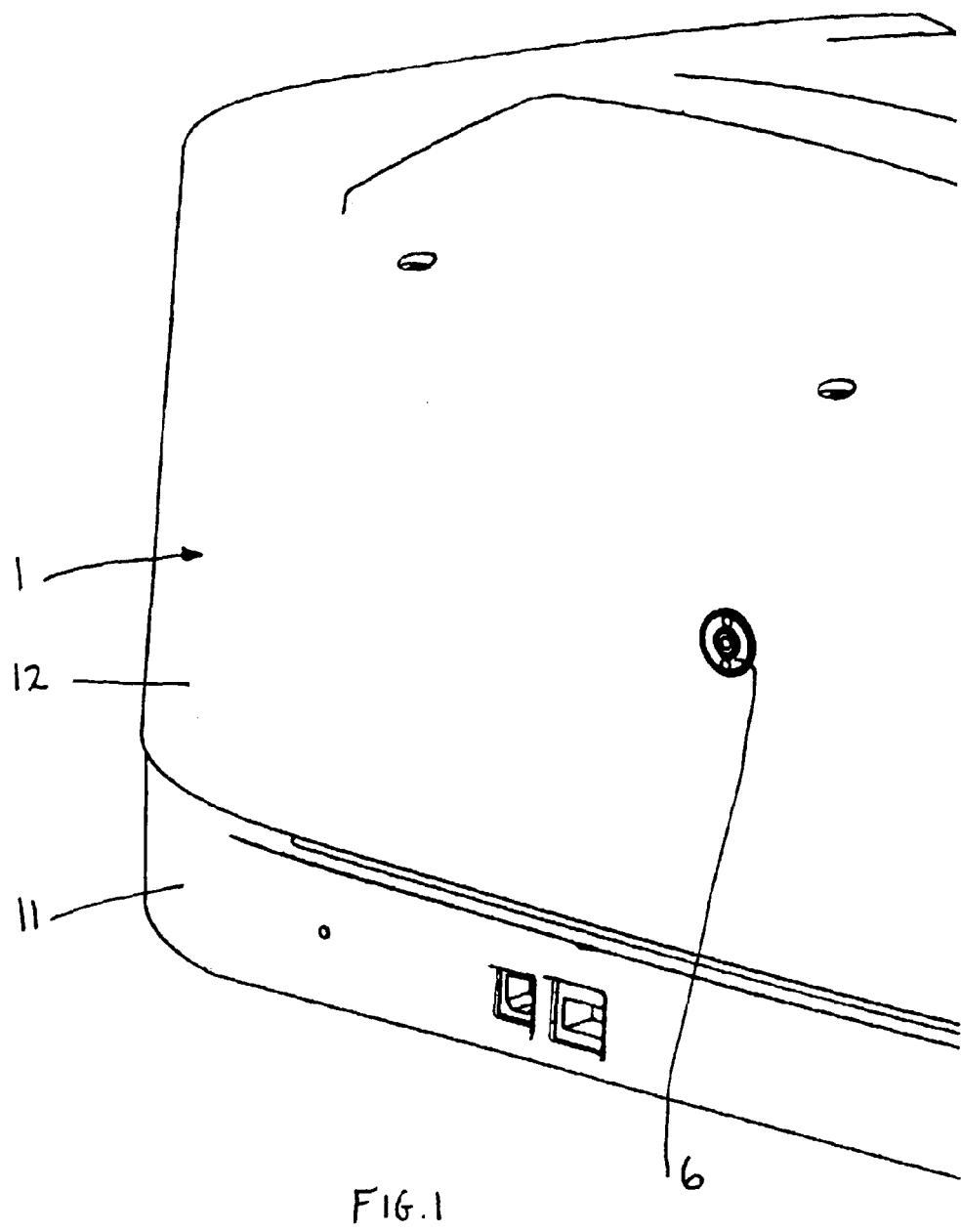
FIG. 1 shows part of a desk top Fourier transform infrared (FTIR) spectrometer.
Figure 2:
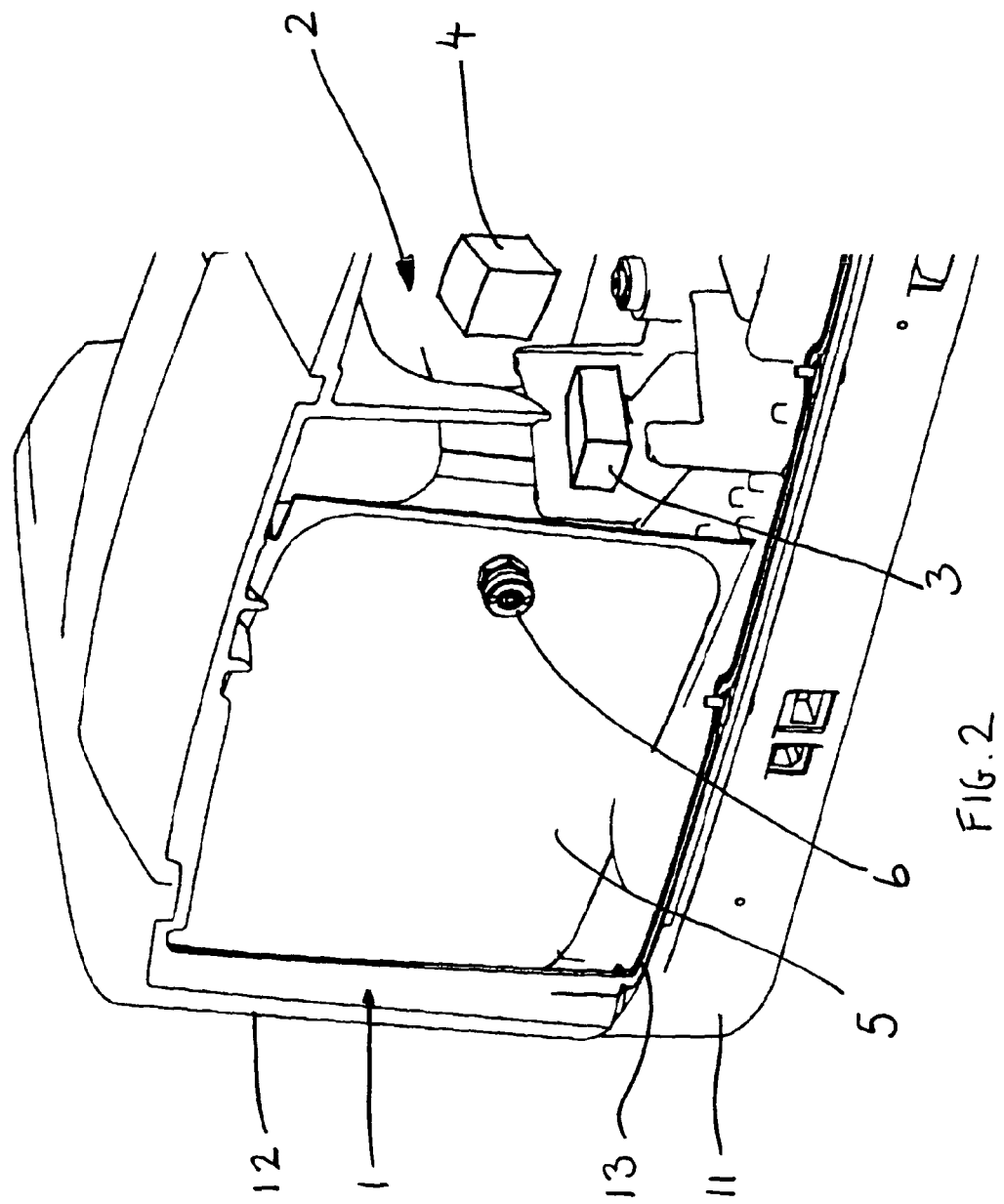
FIG. 2 shows part of the spectrometer of FIG. 1 with part of an outer housing cut away to show internal parts.

FIGS. 1 and 2 schematically show part of a desk top Fourier transform infrared (FTIR) spectrometer which comprises a housing 1 made up of a base 11 and a cover 12. More detail of the cover 12 can be seen from the underside in FIG. 3.

A compartment 2 is defined within the housing 1 which in general terms is sealed from the exterior, ie the surroundings of the spectrometer.

Figure 6:
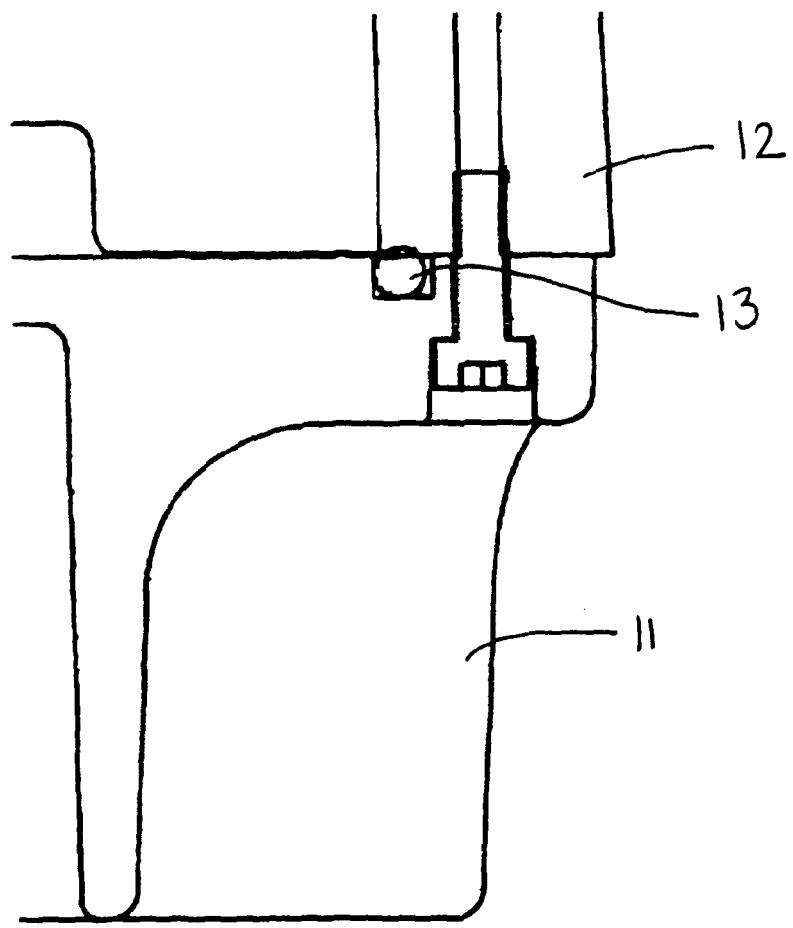
FIG. 6 shows detail of a seal between the cover of the spectrometer shown in FIG. 3 and a corresponding base of the spectrometer.

An O ring seal 13 (see FIGS. 2 and 6) is provided between the base 11 and cover 12 to seal the compartment 2 against the surroundings. The seal will not be perfect and in reality some air will tend to leak past or through the seal 13 into the compartment from time to time.

Provided within the compartment 2 are various components 3 of the spectrometer (which are only visible in FIG. 2 and are represented only in highly schematic form in the drawings).

As alluded to in the introduction, at least some of the components of a spectrometer will tend to be sensitive to moisture and/or other contaminants. The present spectrometer is no exception, and for example in this embodiment, the components 3 include potassium bromide windows which can be damaged by humidity above a threshold level of say 40%. Furthermore, as will be appreciated, the presence of contaminant gases in the compartment 2 can have an adverse effect on the performance of the instrument.

The compartment 2 houses desiccant 4 in an appropriate holder (again shown only in highly schematic form and only in FIG. 2 of the drawings), which can help to protect the components 3.

Figure 3:
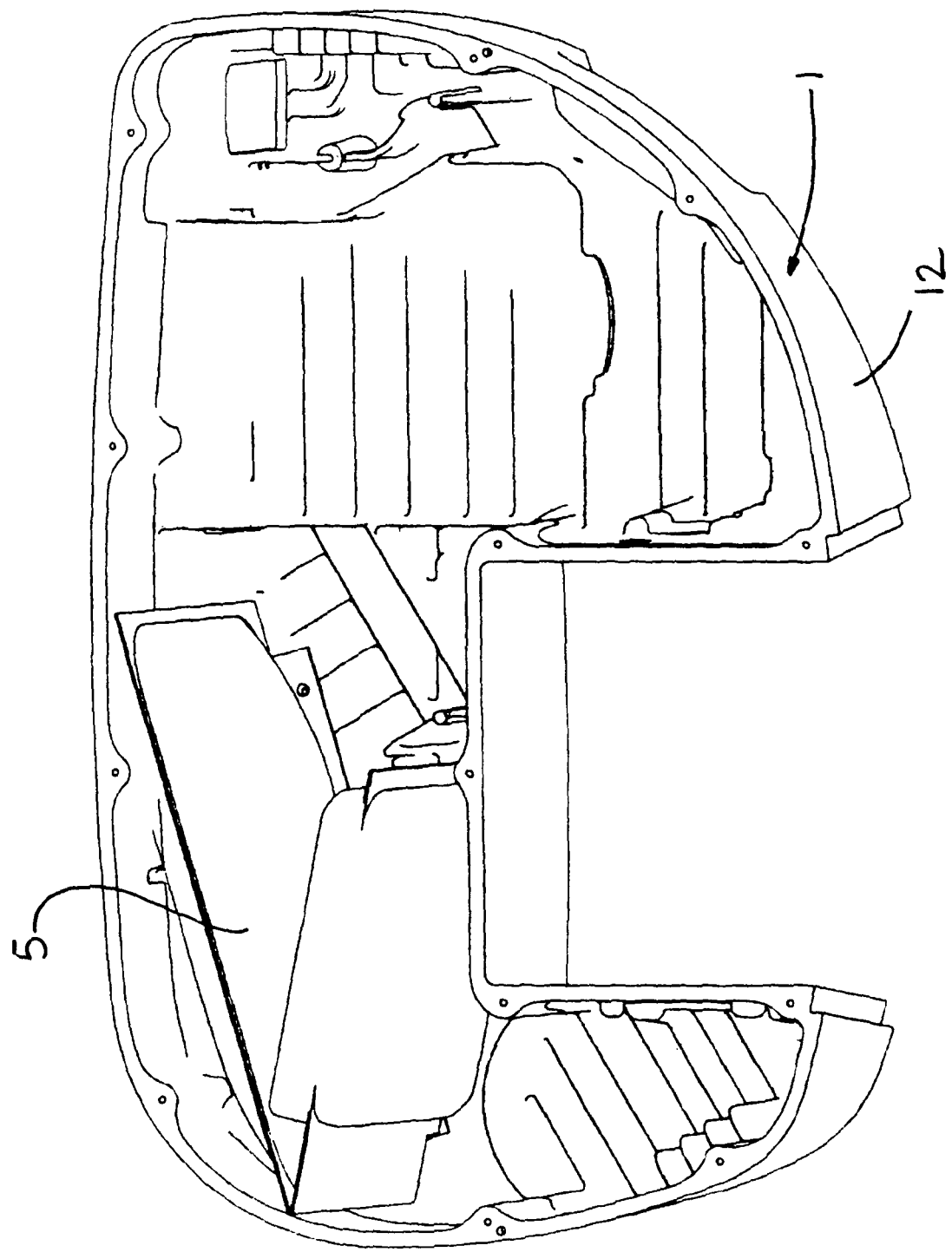
FIG. 3 is an underside view of a cover of the spectrometer shown in FIGS. 1 and 2.
Figure 4:
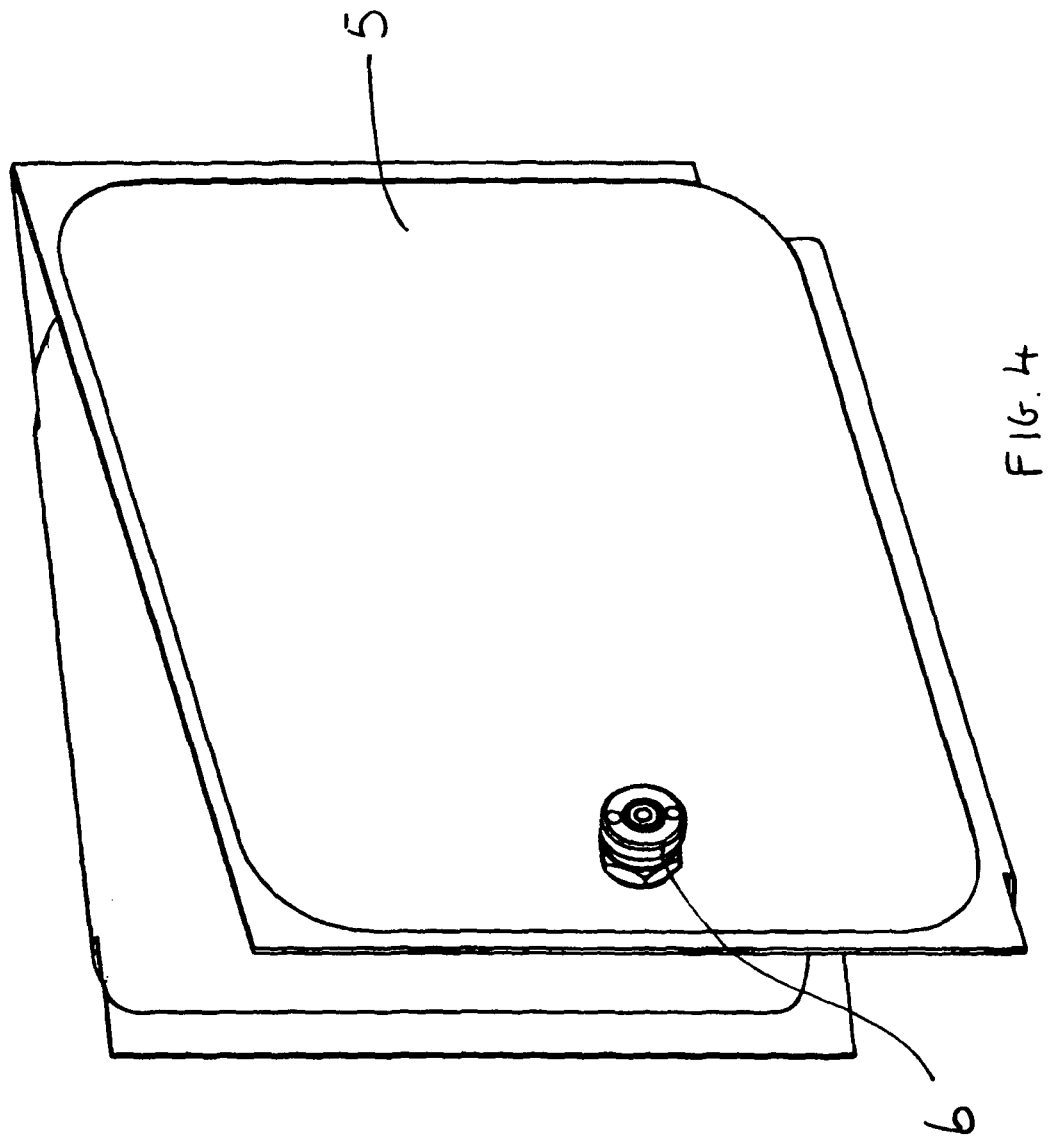
FIG. 4 shows an internal air bag of the spectrometer shown in FIGS. 1 to 3.

The compartment 2 also houses an air bag 5 (visible in situ in FIGS. 2 and 3). The bag 5 is mounted to the housing 1 and more particularly the cover 12 via a tube-like portion 6. One end of the tube-like portion 6 can be seen from the exterior of the spectrometer in FIG. 1 and can be seen again in FIG. 2 where the wall of the cover 12 has been cut away. FIG. 4 shows the bag 5 with the tube-like portion 6 mounted to it in isolation from the remainder of the spectrometer 1.

Figure 5:
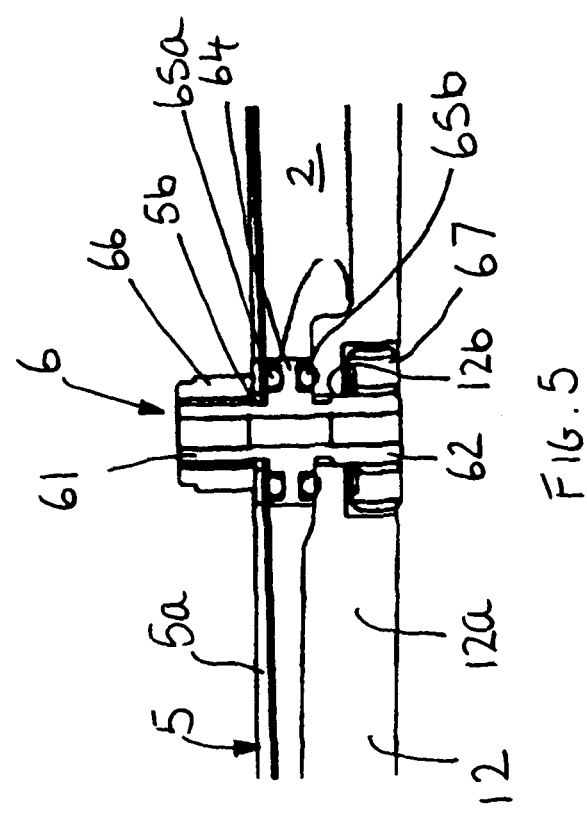
FIG. 5 shows a tube-like portion of the spectrometer of FIGS. 1 to 3.

As illustrated in FIG. 5, which shows the tube-like portion 6 in more detail, a bore runs through the tube-like portion 6 and this provides a fluid communication path between the interior of the bag 5 and the exterior of the compartment 2 (and hence the exterior of the spectrometer as a whole), when the bag 5 is mounted in the spectrometer via the tube-like portion 6 as illustrated in FIGS. 1 and 2.

The bag 5 is provided in the compartment 2 to help prevent the pumping effect described in the introduction above which can occur if there are pressure differences between the internal compartment 2 of the spectrometer and the surroundings. As discussed above, in such a circumstance, normally air will be driven out of or into the compartment 2 and this air will tend to carry moisture and/or other contaminants. As mentioned above, desiccant 4 is provided within the compartment 2 and this can help ensure proper operation of the spectrometer and can provide protection for the components 3 from moisture and/or other contaminants by virtue of absorbing these. However, the desiccant has only a finite capacity for absorbing moisture and/or other components, and thus has a finite life.

In general terms, once the desiccant 4 is exhausted, it either needs to be replaced or the spectrometer will begin to operate at below optimum performance and may be damaged permanently.

The bag 5 provided within the compartment 2 serves to extend the lifetime of the desiccant 4 by reducing the amount of air which tends to flow into and out of the compartment. Because the interior of the bag 5 is connected to the exterior via the tube-like portion 6, where there is a pressure difference between the interior of the compartment 2 and the surroundings, air will tend to be preferentially sucked into or driven out of the bag 5 rather than into and out of the remainder of the compartment 2 (through the O ring seal 13). This simple mechanism can dramatically improve the lifetime of the desiccant 4.

The bag 5 is made from a flexible laminate material. In the present embodiment, it is important that the material of the bag 5 is both flexible to allow expansion and contraction of the bag 5 and also that it has a very low water permeability to ensure that moisture driven into and out of the bag is not allowed through the material of the bag into the compartment 2. A suitable material for the bag can be sheet material used in protective packaging of, for example, food stuffs. Preferably the material is heat sealable since this allows the bag to be formed from one or more sheet of the material which is heat sealed around the open edges to form the closed bag.

The material may include a plastic film together with an aluminum foil layer to give the desired resistance against the transmission of water through the material. One suitable laminate material comprises a PET film layer with an aluminum foil layer bonded to this and an HDPE layer bonded to the other side of the aluminum foil layer. Such a material layer is heat sealable at approximately 200° C. and provides a water vapour permeability of less than 0.05 $gm/m^2/24$ hrs.

In the present embodiment as can be seen in FIGS. 3 and 4, the bag 5 is provided in a folded configuration with two main pockets which can expand and contract in use. This is merely to enable the bag 5 to fit in the space available within the housing 1 of the equipment. In other embodiments any suitable shape of bag 5 may be used.

As mentioned above, the tube-like portion 6 is used to mount the bag 5 within the spectrometer. As can be most clearly seen in FIG. 5, the tube-like portion 6 is arranged so that material of a wall 5a of the bag 5 may be clamped to the tube-like portion 6 and further, the tube-like portion 6 can be clamped to the wall 12a of the housing 1, in this case the cover 12.

A suitable aperture 5b is provided in the wall of the bag 5a through which a first threaded portion 61 of the tube-like portion projects. Similarly, an appropriate aperture 12b is provided in the wall 12a of the cover 12 through which a second threaded portion 62 of the tube-like portion 6 projects. Between the two threaded portions 61, 62, the tube-like portion 6 has a flange portion 64 which carries a first O ring 65a for contacting with and sealing against the wall 5a of the bag and a second O ring 65b for contacting with and sealing against the wall 12a of the cover 12. Corresponding nuts 66 and 67 are provided for the respective threaded portions 61 and 62, so that the wall of the bag 5a and the wall of the cover 12a can be clamped against the O rings 65a and 65b to provide an effective seal such that the ingress and egress of fluid through the apertures 5b and 12b in the bag 5 and cover 12 will only happen through the bore of the tube-like portion 6.

Thus, with this arrangement the tube-like portion 6 conveniently provides a fluid communication path between the interior of the airbag 5 and the exterior of the compartment 2 (and hence the exterior of the spectrometer) as well as providing a mounting for the bag 5 within the spectrometer.

In the current embodiment, the tube-like portion 6 will be mounted to the bag 5 during manufacture of the bag 5 and before at least the final seal is made to close the bag, thus providing a bag 5 plus tube-like portion 6 assembly as shown in FIG. 4 which can then be mounted into the spectrometer.

With the arrangement described above, the bag 5 can protect the compartment 2 from most of the inflow and outflow of air which would normally occur. However, it is recognised that in practical circumstances there may be a situation where the change in volume which can be provided by the bag to counter differences in pressure will not be sufficient to neutralise the pressure difference between the compartment 2 and the surroundings. Therefore, as shown in FIG. 7, in order to protect the bag 5 and the seals 13, 65a, 65b from damage, the spectrometer is provided with an over pressure valve 7a and an under pressure valve 7b. Each of these valves is a one way pressure relief valve and is provided in an appropriate aperture in the wall 12a of the cover 12. As will be evident, the over pressure valve 7a is provided so that if the pressure within the compartment 2 is greater than the pressure of the surroundings by more than a threshold amount, then the over pressure valve 7a will open, allowing air to escape from the compartment 2. The opposite is true in respect of the under pressure valve 7b.

In the present embodiment, both the over pressure valve 7a and under pressure valve 7b are in the form of umbrella valves. Each has a respective skirt 71a, 71b which seals against the wall 12a in normal circumstances, but which can be forced upwards by greater than a threshold pressure driven through the respective aperture in the wall portion 12a alongside the respective stem 72a, 72b into the void underneath the respective skirt 71a, 71b. When there is sufficient pressure in this void, compared with the other side of the respective skirt 71a, 71b, the skirt will tend to lift up to release air and hence allow equalisation of this pressure difference and then seal back down against the wall 12a.

In order to protect against diffusion of moisture through the seals 13, 65a, 65b and possibly the material of the valve 7a and 7b, the material of these elements should be carefully chosen.

In respect of at least the seals 13, 65a, 65b use of fluroelastomers such as Viton, Fluorel or Aflas with a water diffusion rate of less than 100 grams of water per year is preferred. If a lower degree of protection against the ingress of water is required then other elastomers such as perfluroelastomer might be suitable.

The bag 5 is provided wholly within the compartment 2 and particularly wholly within the housing 1 of the spectrometer. This helps to protect the bag 5 from damage whilst allowing it to perform its function of varying the volume of the remainder of the compartment 2 which is not occupied by the bag to allow pressure equalisation.

In the present embodiment, when the bag is expanded to its maximum extent by flow of air into its interior, it occupies in the order of 10% to 15% of the internal volume of the compartment. Of course, in other embodiments, the bag may be chosen so that at its maximum extent it occupies a smaller or greater volume of the internal compartment than this.

Preferably the spectrometer will be manufactured so that at a typical operating temperature and pressure, the bag will be midway through its inflation range. That is to say its volume will be at the mid-point such that there is a significant degree to which the volume of the bag may decrease as well as increase from the starting position.

The material of the bag is chosen so as to be as flexible as is practical whilst providing the required barrier effect to gas and in particular moisture.

Note that if the instrument is not sufficiently leak tight (as provided for by the seals 13, 65a, 65b in the present embodiment) then due to the necessary stiffness or resistance in the bag 5 to changing volume, moist air will tend to preferentially flow into the compartment 2 of the instrument rather than the bag 5.

The invention claimed is:

1. A spectroscopic instrument, comprising:
   a compartment which houses spectroscopic instrument components and is arranged to receive desiccant to protect the instrument components;
   a deformable container having at least one wall portion which is movable within the compartment so as to vary a volume of the compartment that is occupied by the deformable container as the container is deformed, the interior of the deformable container being in fluid communication with the surroundings of the instrument, such that a difference in pressure between the compartment and the surroundings tends to cause the deformable container to deform, moving the wall portion; and
   at least one valve for allowing fluid communication between the compartment and the surroundings, when a pressure difference between the compartment and the surroundings exceeds a predetermined threshold.

2. A spectroscopic instrument according to claim 1 in which two valves are provided, one being an over-pressure valve for relieving over-pressure in the compartment and one being an under-pressure valve for relieving under-pressure in the compartment.

3. A spectroscopic instrument according to claim 1 in which the deformable container is of a laminate material, the laminate material comprising at least one plastic layer and at least one metallic film layer.

4. A spectroscopic instrument according to claim 1 in which the deformable container comprises a bag.

5. A spectroscopic instrument according to claim 4 in which the bag comprises two or more walls which are heat sealed together.

6. A spectroscopic instrument according to claim 1 which comprises a tube which is arranged to allow fluid communication between the interior of the deformable container and the surroundings.

7. A spectroscopic instrument according to claim 6 in which the tube is mounted on the deformable container.

8. A spectroscopic instrument according to claim 6 in which a wall of the deformable container comprises an aperture through which the tube extends and a seal is provided between the tube and the material of the deformable container to seal against at least one of ingress and egress of fluid through the aperture other than through the tube.

9. A spectroscopic instrument according to claim 6 in which the tube is mounted to the compartment.

10. A spectroscopic instrument according to claim 6 in which a wall of the compartment comprises an aperture through which the tube extends, and a seal is provided between the tube and the compartment wall to seal against at least one of ingress and egress of fluid through the aperture in the compartment wall other than through the tube.

11. A spectroscopic instrument according to claim 1 in which, when at its maximum extent, the deformable container occupies between 5% and 50% of the volume of the compartment.

12. A spectroscopic instrument according to claim 1 in which, when at its maximum extent, the deformable container occupies between 10% and 15% of the volume of the compartment.

13. A spectroscopic instrument, comprising:
   at least one spectroscopic instrument component being sensitive to moisture;
   a compartment for housing the at least one spectroscopic instrument component and arranged to receive desiccant to protect the at least one spectroscopic instrument component;
   a deformable container having at least one wall portion which is movable within the compartment so as to vary a volume of the compartment that is occupied by the deformable container as the container is deformed, the interior of the container being in fluid communication with the surroundings of the instrument, such that a difference in pressure between the compartment and the surroundings tends to cause the deformable container to deform, moving the wall portion; and
   at least one valve for allowing fluid communication between the compartment and the surroundings, when a pressure difference between the compartment and surroundings exceeds a predetermined threshold.

14. A spectroscopic instrument according to claim 13 in which two valves are provided, one being an over-pressure valve for relieving over-pressure in the compartment and one being an under-pressure valve for relieving under-pressure in the compartment.

15. A spectroscopic instrument according to claim 13 in which the deformable container is of a laminate material, the laminate material comprising at least one plastic layer and at least one metallic film layer.

16. A spectroscopic instrument according to claim 13 in which the deformable container comprises a bag.

17. A spectroscopic instrument according to claim 13 which comprises a tube which is arranged to allow fluid communication between the interior of the deformable container and the surroundings.

18. A spectroscopic instrument according to claim 17 in which the tube is mounted on the deformable container.

19. A spectroscopic instrument according to claim 17 in which a wall of the deformable container comprises an aperture through which the tube extends and a seal is provided between the tube and the material of the deformable container to seal against at least one of ingress and egress of fluid through the aperture other than through the tube.

20. A spectroscopic instrument according to claim 17 in which a wall of the compartment comprises an aperture through which the tube extends, and a seal is provided between the tube and the compartment wall to seal against at least one of ingress and egress of fluid through the aperture in the compartment wall other than through the tube.

* * * * *